United States Patent
Bonner et al.

(10) Patent No.: US 6,786,404 B1
(45) Date of Patent: Sep. 7, 2004

(54) SORT SYSTEM AND METHOD UTILIZING INSTRUCTIONS TO DIRECT PLACEMENT AND PROVIDE FEEDBACK

(76) Inventors: Brett B. Bonner, 164 Walnut Bend Cove, Cordova, TN (US) 38018-7227; Ole-Petter Skaaksrud, 6945 Stone Ridge Dr., #33, Memphis, TN (US) 38115; Daniel L. Specht, 4094 Sunny Meadows, Bartlett, TN (US) 38135; David J. Dutton, 109 Windsong Ct., Madison, AL (US) 35757; Mark J. Thomas, 9920 Houston Oak Dr., Memphis, TN (US) 38139

( * ) Notice: Subject to any disclaimer, the term of this patent is extended or adjusted under 35 U.S.C. 154(b) by 0 days.

(21) Appl. No.: 09/544,292

(22) Filed: Apr. 6, 2000

Related U.S. Application Data

(60) Provisional application No. 60/128,213, filed on Apr. 7, 1999.

(51) Int. Cl.[7] .............................................. G06F 17/60
(52) U.S. Cl. ........................ 235/385; 235/383; 705/406; 705/407
(58) Field of Search ................................ 235/385, 384, 235/383, 462.13, 462.14, 470; 705/406, 407, 408, 23

(56) References Cited

U.S. PATENT DOCUMENTS

| | | | |
|---|---|---|---|
| 4,181,948 A | | 1/1980 | Jackson et al. ............. 364/478 |
| 5,043,908 A | * | 8/1991 | Manduley et al. .......... 700/227 |
| 5,072,400 A | * | 12/1991 | Manduley .................... 700/226 |
| 5,153,842 A | * | 10/1992 | Dlugos et al. .............. 700/227 |
| 5,677,834 A | | 10/1997 | Mooneyham ................ 364/188 |
| 5,715,314 A | | 2/1998 | Payne et al. .................. 380/24 |
| 5,794,789 A | | 8/1998 | Payson et al. .............. 209/549 |
| 5,826,242 A | | 10/1998 | Montulli ....................... 705/27 |
| 5,855,020 A | | 12/1998 | Kirsch ......................... 707/10 |
| 5,877,765 A | | 3/1999 | Dickman et al. ........... 345/349 |
| 5,881,890 A | | 3/1999 | Wiley .......................... 209/703 |
| 5,892,761 A | | 4/1999 | Stracke, Jr. ................. 370/395 |
| 5,897,620 A | | 4/1999 | Walker et al. ................. 705/5 |
| 5,920,056 A | | 7/1999 | Bonnet ........................ 235/383 |
| 5,921,378 A | | 7/1999 | Bonnet ........................ 198/850 |
| 5,923,017 A | | 7/1999 | Bjorner et al. .............. 235/385 |

\* cited by examiner

*Primary Examiner*—Michael G. Lee
*Assistant Examiner*—Uyen-Chau N. Le
(74) *Attorney, Agent, or Firm*—Finnegan, Henderson, Farabow, Garrett & Dunner, LLP

(57) ABSTRACT

The present invention includes a method for sorting objects that comprises capturing object information from machine-readable indicia on an object, determining routing information from the information, determining, based on the routing information, a correct sort destination for the object, and generating a visual and/or audio command identifying the correct sort destination for the object. The present invention also includes an object sorting system, comprising a rack system that includes sort destination modules and a management system. The management system comprises a control system, an information capture device for reading object information from machine-readable indicia from each object and for outputting the corresponding data to the control system, and an audio system for providing instructions to an oprator.

30 Claims, 15 Drawing Sheets

120

148

148-01: User Interface options to initiate SD Close out By Weight, Sorter Button or Quarterback Button. Sorter can not sort new objects to this SD

148-02: Is the SD waiting for an Object Placement or Weight
- Yes → 148-03: Wait until the SD receives placement message and/or Object weight
- No ↓

148-04: Quarterback Light Illuminates solid

148-05: Quarterback removes crate

148-06: Scale checks weight and senses crate removed
- No → (loop)
- Yes ↓

148-07: System sends signal to SD light to fast flash

148-08: Quarterback pushes the SD button

148-09: Print the CONS TAG and SD light continues fast flash

148-10: Update database

148-11: Has printer completed printing
- No → (loop)
- Yes ↓

148-12: Scale determines if empty crate has be place in SD
- No → 148-13: SD Light starts to flash slow → 148-14: Quarterback places new crate in the SD → (loop back to 148-11)
- Yes ↓

148-15: SD light goes off

148-16: Sorter is allowed to sort objects to this SD again

148-17: Is this an End Sort?
- No → 148-18: Return IDLE process
- Yes → 150: Return to End Sort Process

Figure 10

SORT SYSTEM AND METHOD UTILIZING INSTRUCTIONS TO DIRECT PLACEMENT AND PROVIDE FEEDBACK

CROSS REFERENCE TO RELATED APPLICATION

This patent application claims priority to Provisional U.S. patent application Ser. No. 60/128,213, entitled "Sort System Utilizing Instructions to Direct Placement and Provide Feedback", filed on Apr. 7, 1999, which is herein incorporated by reference.

BACKGROUND OF THE INVENTION

When a person wants to send an object to someone else (the "addressee"), they wrap up the object and address it. Then this person, which we will call the customer, either drops off the object to a place where it is stored temporarily or the delivery company (the "deliverer") picks it up and drops it off there. In the case of the U.S. Postal Service, this storage location would usually be the local Post Office.

At the storage location this object and many others are gathered, and must then be sorted. They must be sorted to decide where to send each object, so each object must be looked at to decide which plane, truck, or train to put it on so that it goes to the area where the addressee lives. For example, if a customer in Spokane, Washington wants to send a 4 by 6 inch picture frame to a friend in Kennebunk, Me. the customer wraps it, addresses it, and either drops it off at the deliverer's Spokane office, or has the deliverer pick it up. By the end of the day the deliverer has, let us say, 6200 objects in its central Spokane office. Let us also say that of the 6200 objects, 112 are destined for the Portland, Me., area of which three are destined for Kennebunk. The deliverer must sort the objects to separate from the 6200 the 112 to be sent to Portland, Me. When the 112 objects arrive from Spokane in Portland, the Portland office will have received, let us say, 1430 additional objects from the rest of the world that are destined for delivery addresses in the Portland area.

The objects in the Portland office must be sorted again, to decide which delivery vehicle to put each object on. One of these vehicles is scheduled to drive to Kennebunk. Thus, after sorting the 1430 objects from the rest of the world, plus the 112 from Spokane, 38 are destined for Kennebunk, only three of which (including our customer's picture frame) is from Spokane. These 38 are placed in the Kennebunk-bound delivery vehicle which then delivers the picture frame and the 37 other objects to addresses in Kennebunk.

In this example, the picture frame only went through two sortings: one in Spokane and one in Portland; but a typical object may go through many more. Delivery companies, not surprisingly, have developed methods and machines to sort objects.

Delivery companies, especially those delivering large quantities of small objects, usually use one of two methods to sort objects. In the first, a person picks up each object, reads information off of the object, decides where to place the object, and then places the object in an appropriate sort destination (like, for instance, a bin bound for Portland or Kennebunk). The second conventional method uses a fully automated system where a machine, rather than a person, performs the above tasks. The drawbacks of the first method include human error, slow reading, and slow decision making. The second method, i.e., the fully automated system, is not without failings as well, most notably that it is expensive.

SUMMARY OF THE INVENTION

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purposes of the invention, as embodied and broadly described herein, the invention comprises a method for sorting objects, which includes capturing object information from a machine readable indicia on an object, determining routing information from the information, determining, based on the routing information, a correct sort destination for the object, and generating a visual and/or audio command identifying the correct sort destination for the object.

The invention also comprises an object sorting system comprising a rack system, comprising a plurality of sort destination modules, each sort destination module further comprising a sort destination capable of holding one or more objects, a management system comprising a control system, an information capture device for reading machine-readable indicia from each object and for outputting the information to the control system, and an audio system for providing instructions to an operator.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

FIG. 10 is a flow-chart of the sort destination close-out process shown in FIG. 1;

DESCRIPTION OF THE PREFERRED EMBODIMENT

Figure 1:
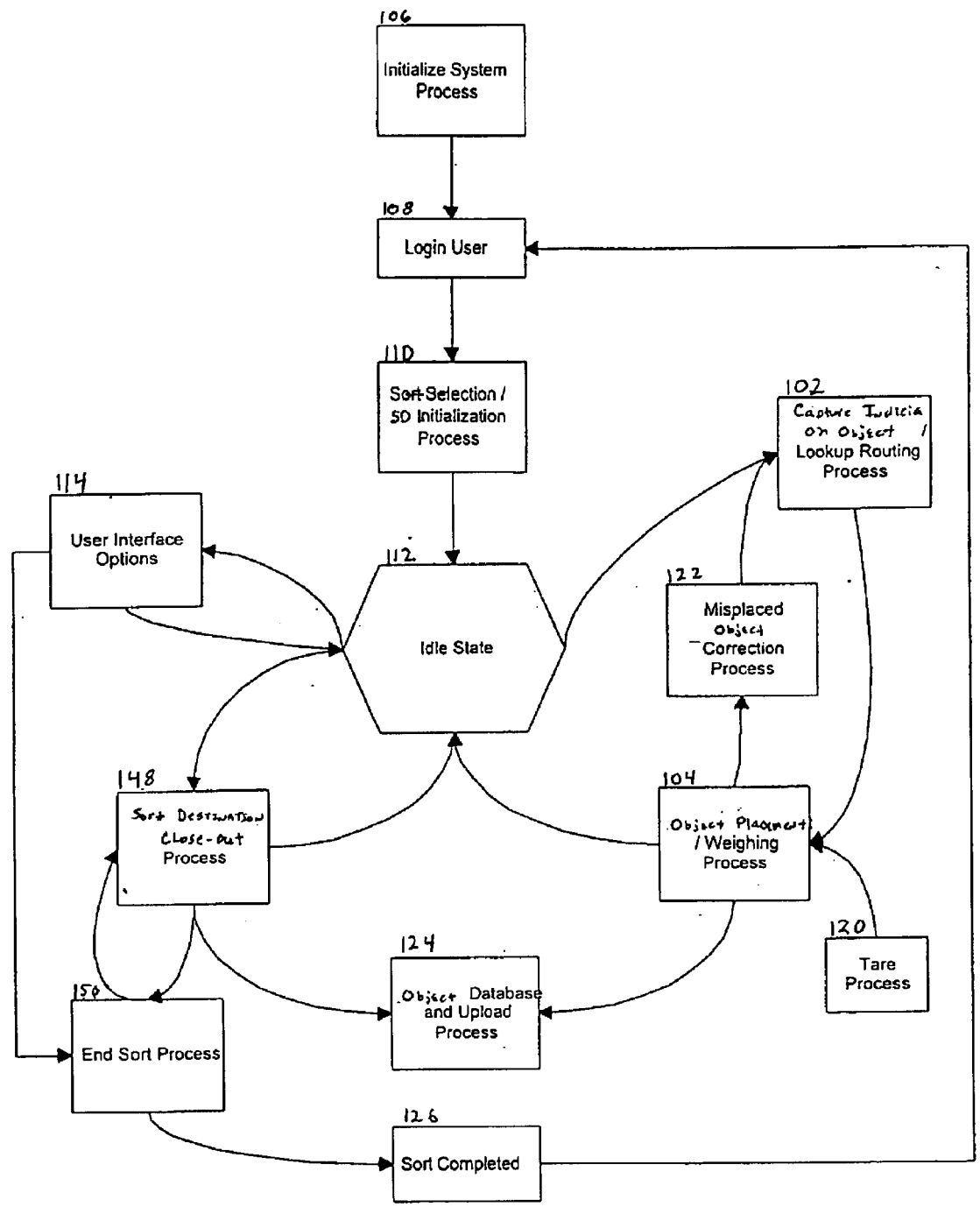
FIG. 1 is a flow-chart of an automation system in accordance with the present invention.

Reference will now be made in detail to the present preferred embodiment of the invention, an example of which is illustrated in the accompanying drawings. Wherever possible, the same reference numbers will be used throughout the drawings to refer to the same or like parts.

In a manual system for handling the processing of objects, a person reads information off of an object and then decides where to place the object. The difficulty with this system is that people tend to make mistakes and are slow, at least compared to a fully automated system, in reading object labels and in deciding where to place the objects. In an automated system, a machine reads information from an object, decides where to place the object, and places the object. The present invention comprises a "soft" automation sorting system. As used herein, the term "soft" is used to describe a hybrid system using people to physically sort objects and a control system to manage the sort.

In accordance with the present invention, a method for sorting objects comprises the steps of capturing object information from machine-readable indicia on an object, determining routing information from the information, determining, based on the routing information, a correct sort destination for the object, generating a visual and/or audio command identifying the correct sort destination for the object, and verifying that the object is placed into the correct sort destination.

In more detail, the soft automation system reads information off of an object using an information capture device (e.g., a scanner). It then processes the information and decides where the object should be placed. The system then alerts the person responsible for placing the objects (the "operator") with visual and/or audio instructions, telling the operator into which sort destination (also referred to as a "bin") to place the object. If the system includes sensors to detect where objects have been placed, the soft automation system will recognize when the operator places an object into a wrong sort destination. When an object is placed in the wrong sort destination the system will inform the operator, signaling him or her to correct it. Thus, the soft automation system significantly speeds up the sorting process by reading the object label and deciding where each object goes and reduces errors.

If the object was placed in the correct sort destination, the soft automation system recognizes this and informs the operator that the object has been placed in the correct sort destination. This process of capturing information from the indicia of an object, processing the information from that object, instructing the operator where to place the object, and insuring that the object is in the correct sort destination, is usually repeated until all of the objects have been sorted.

To manage this sorting process, control system 2 manages where objects are to be placed but also does much more. For instance, once an object has been correctly placed in a sort destination, control system 2 receives the weight from the sort destination's scale, so that control system 2 will know the object's weight. By so doing, the control system 2 can keep track of the weight of every object, which can help in deciding into which plane or delivery vehicle the object should be placed and, further, helps the delivery company know when to charge the customer for an overweight object.

The preferred embodiment for sorting objects will be discussed as an aspect of an embodiment for the soft automation system. An embodiment of the soft automation system includes a method for sorting objects, and will now be discussed in general terms; the details of each step, which make up how the system operates, will be discussed later. The soft automation system is illustrated in FIG. 1, and the preferred embodiment for a method of sorting objects is represented by capture indicia on object/lookup routing sort automation system step 102 as well as the object placement aspect of object placement/weighing process step 104.

The embodiment of the machine part of the soft automation system may be used to implement the above method. This machine part is activated by initializing control system 2, which manages the entire soft automation system. After initialization step 106 is complete, the operator logs in, step 108. The operator and control system 2 then work together to initialize the sort destinations, step 110, FIG. 1.

Once these preliminary initializing steps are completed, control system 2 idles in idle state step 112, waiting to begin sorting objects. Usually, the operator scans an object's indicia which prompts the control system 2 to begin step 102.

In capturing information from an object's indicia, step 102, illustrated in FIG. 1, control system 2, with the aid of the operator or a conveyor belt, captures object information from machine-readable indicia on an object to be sorted, determines routing information from the object information (e.g., a postal code, tracking number, or sort destination), and uses that routing information to determine in which sort destination the object should be placed. The routing information usually includes the path that the object will travel after reaching the sort destination. In cases where the object will not travel after being placed into its sort destination, the routing information will not include this path because there is none (this will often be the case when this method is used to sort objects at the final destination for the objects, such as in a storage facility). Capturing information from indicia on objects, step 102, is typically repeated until all of the objects have been sorted into their correct sort destinations.

After an object (also called a document or package) has been scanned to capture its information from its indicia and placed in a sort destination, control system 2 determines whether the object is in the correct sort destination. If the object is in the correct sort destination its weight is measured and sent to control system 2. If it is not in the correct sort destination, control system 2 instructs the operator to correct the error according to misplaced object correction process step 122. The process of weighing object and checking that it is in the correct sort destination is represented by object placement/weighing process step 104 of FIG. 1. When the object is in the correct sort destination and its weight has been recorded, control system 2 returns to idle state, step 112.

After all of the objects have been placed correctly, the operator and control system 2 close out each sort destination (sort destination close-out process step 148). After completing this step control system 2 idles, idle state step 112, or ends the process, end sort process step 150. The end sort process step 150 is completed by control system 2, thereby ending the current sort session (sort completed step 126). Control system 2 then updates/uploads the object database (step 124), by communicating with scan central server 154.

Figure 2:
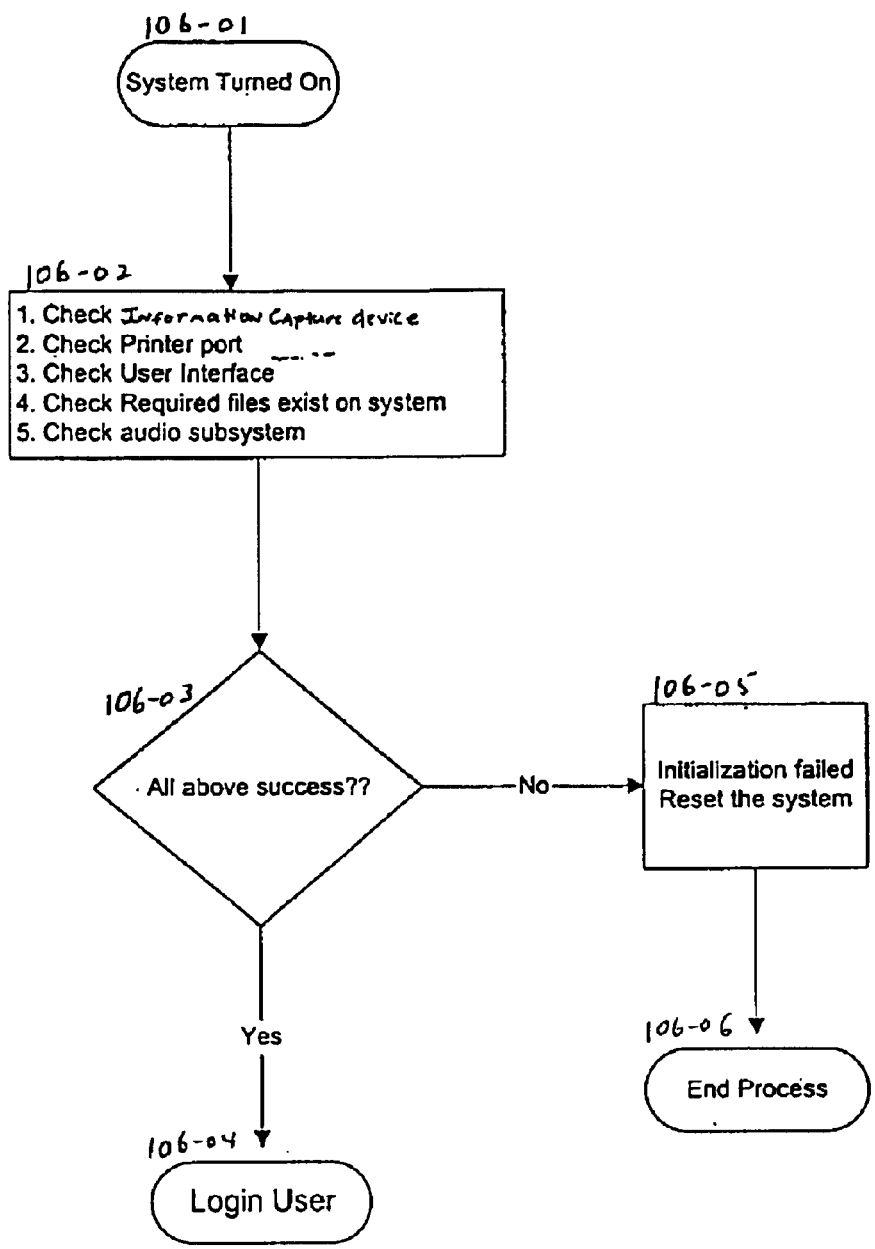
FIG. 2 is a flow-chart of the control system initialization process shown in FIG. 1.

Each step performed by the soft automation system will now be discussed in more detail. Referring to FIG. 2, initialization system process step 106 begins when the operator turns on control system 2, step 106-01. First, control system 2 runs a diagnostic program, step 106-02, to check other components used in the soft automation system. Control system 2 checks to be sure that a printer port, user interface, and audio system are working properly. Control system 2 also checks required files within its memory. If the components and required files are judged error-free, step 106-03, control system 2 waits for the operator to log in, step 106-04. If the diagnostic fails, control system 2 resets and ends the process, steps 106-05 and 106-06.

Figure 3:
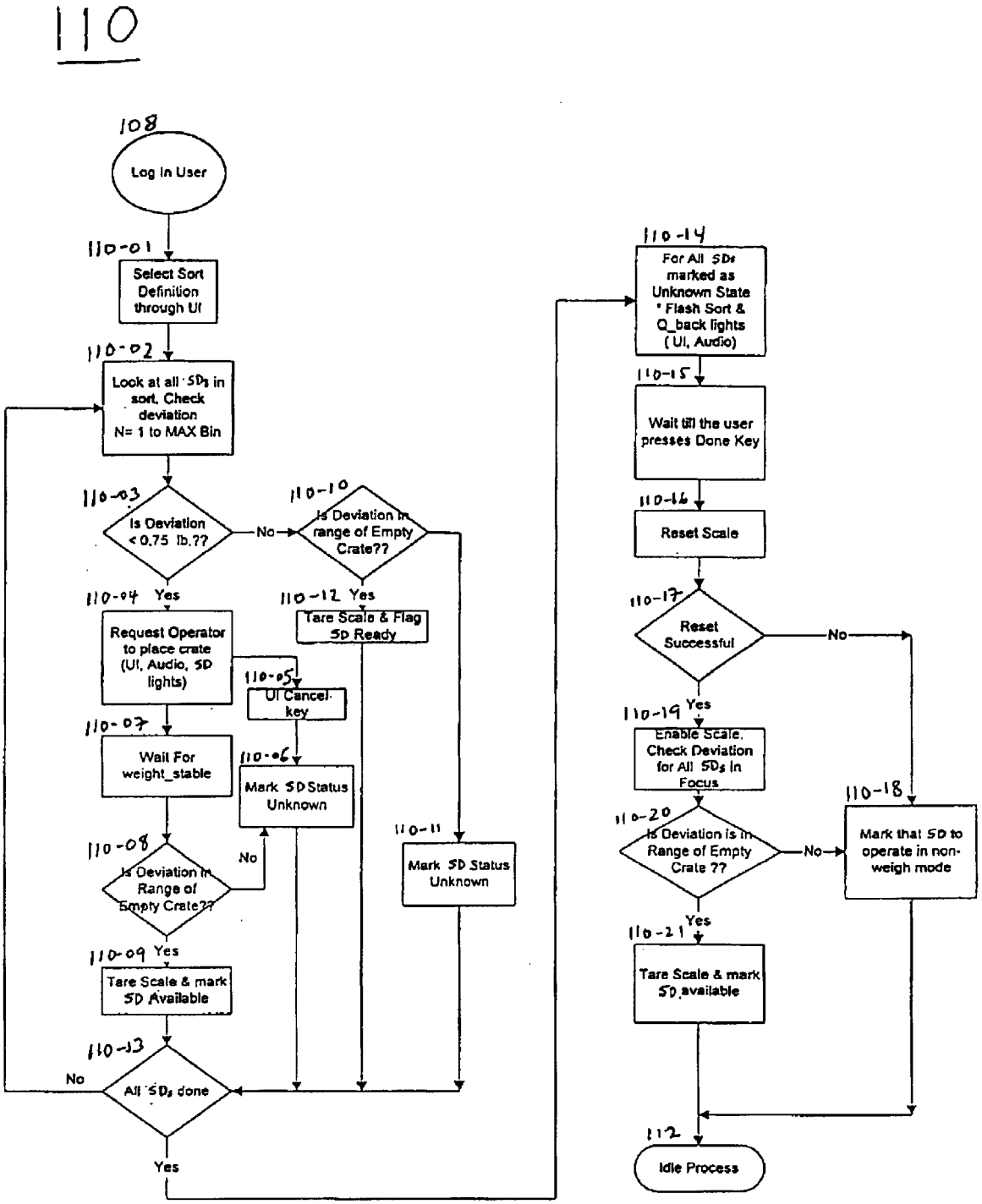
FIG. 3 is a flow-chart of the sort selection/sort destination initialization process shown in FIG. 1.

Referring to FIG. 3, after the soft automation system is initialized according to step 106 and the operator logs in, step 108, the operator and control system 2 work together to complete a sort selection and sort destination (also referred to as "SD" in most of the figures) initialization process step 110. In step 110 the operator selects which type of sort he or she wants to do, sort definition step 110-01, and then control system 2 checks each sort destination for its deviation in weight from the weight of an empty sort destination (the sort destination's calibrate zero), step 110-02. In order to complete the sort destination initiation process, control system 2 makes two assumptions: i) the calibrate zero does not drift more than a set amount, for example, 0.75 or more pounds and ii) empty crates have a given weight range, for example, between 1.5 and 2.5 pounds. Control system 2 checks the weight of each sort destination, one at a time. If the weight is not off, i.e., the deviation is 0.75 or less pounds from the calibrate zero, control system 2 assumes that the sort destination does not contain a crate (see step 110-03). If so, control system 2 requests that the operator place a crate in each sort destination, step 110-04. Control system 2 will make this request with a combination of audio, visual, and/or user interface-based commands. The operator may place a crate in the sort destination or over-ride the request by canceling the command, step 110-05, in which case control system 2 will mark the sort destination's status as unknown, step 110-06. Control system 2 waits for the scale to stabilize (step 110-07) and then checks again to determine if the deviation is within the range of an empty crate, step 110-08. If neither condition is met, control system 2 marks the sort destination status as unknown, step 110-06. If either condition is satisfied, control system 2 tares the scale (set the scale to zero) and marks the sort destination as available to place objects into (step 110-09).

If, on the other hand, the deviation is greater than 0.75 pounds, control system 2 marks the sort destination status as unknown, step 110-11, so long as the deviation is not within the range of the weight of an empty crate (step 110-10). If the deviation is within the range of the weight of an empty crate, (step 110-10), it will tare the scale and flag the sort destination as ready (step 110-12), provided that the sort destination has an empty crate in it. Control system 2 continues this procedure until the status of all of the sort destinations have been marked as either ready or unknown (step 110-13).

Once the status of the sort destinations has been marked, control system 2 activates a visual indicator, such as an indicator light, (step 110-14) that correspond to the unknown-status sort destinations to alert the operator or a quarterback (the person who aids the operator by handling the crates, usually from opposite side of the sort destination from the side that the operator operates on) that the sort destination status is unknown. The operator or quarterback then corrects the problem and then enters "done" via the user interface, step 110-15. Control system 2 then resets the scales on the unknown-status sort destinations (step 110-16). If the reset was not successful (checked at step 110-17) control system 2 marks that sort destination to permit it to operate in non-weigh mode (step 110-18). If the reset is successful control system 2 enables the scale and checks the deviation (both according to step 110-19) and, if the deviation is now within the range of an empty crate, step 110-20, tares the scale and marks the sort destination ready, step 110-21. If the deviation is still not within the range of an empty crate, control system 2 marks the sort destination to operate in non-weigh mode, step 110-18. After completing these steps, control system 2 returns to idle state step 112. When in idle state step 112 control system 2 waits for input from the operator, quarterback, or for an object to be scanned. The operator may then begin the step that encompasses a method for sorting objects.

Figure 4:
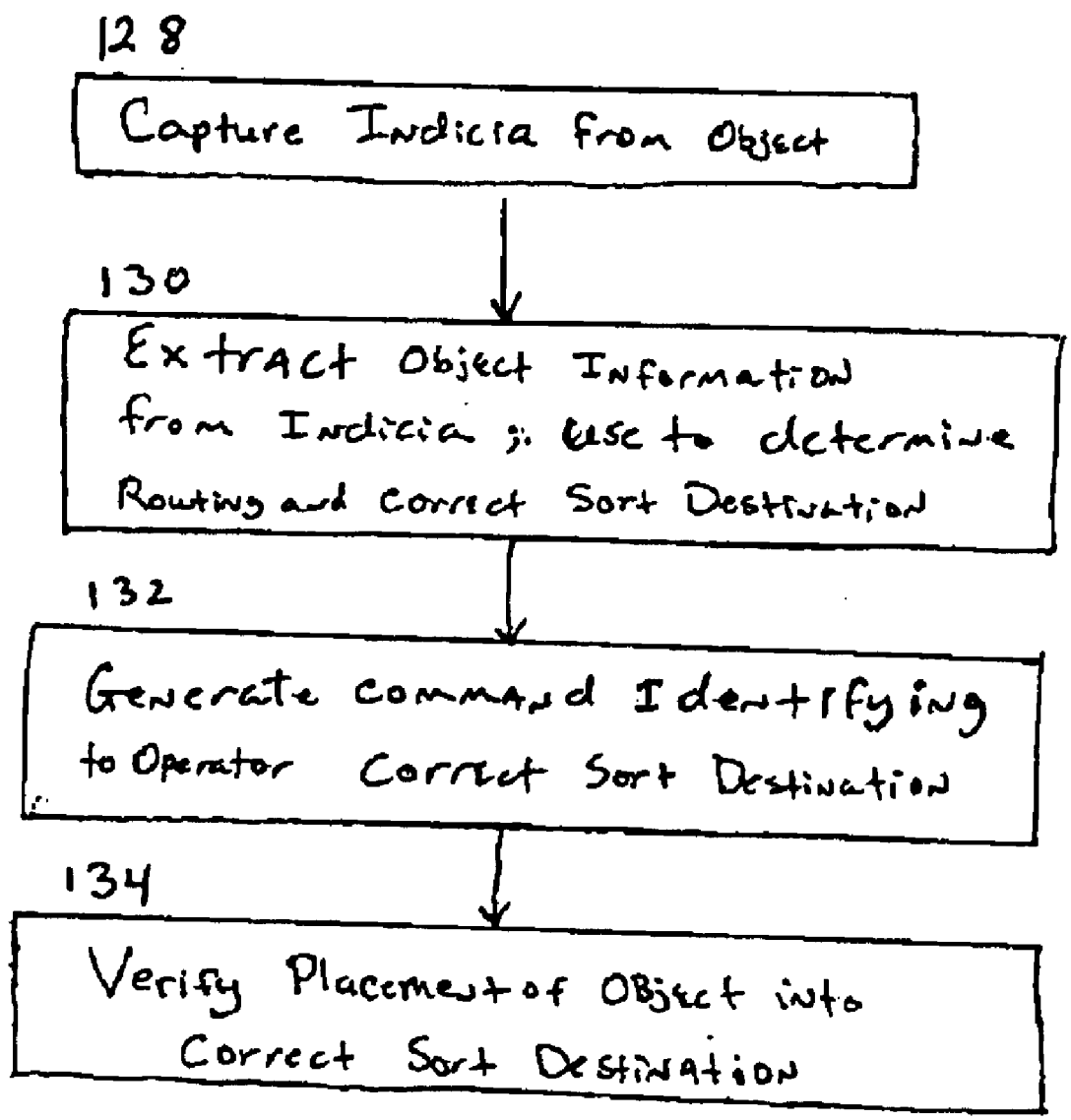
FIG. 4 is a flow-chart of a method of sorting objects in accordance with the present invention.
Figure 5:
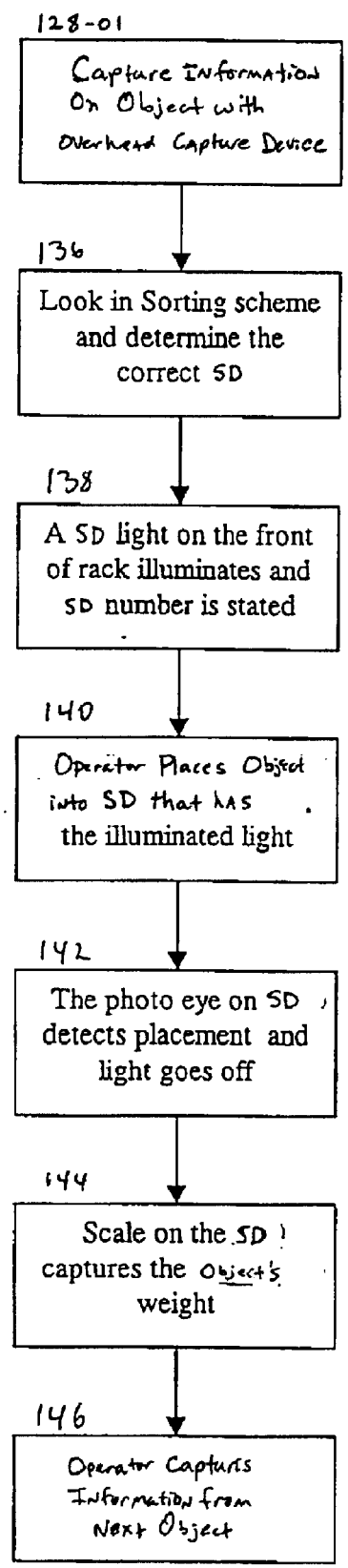
FIG. 5 is a flow-chart of a sorting system in accordance with the present invention.
Figure 6:
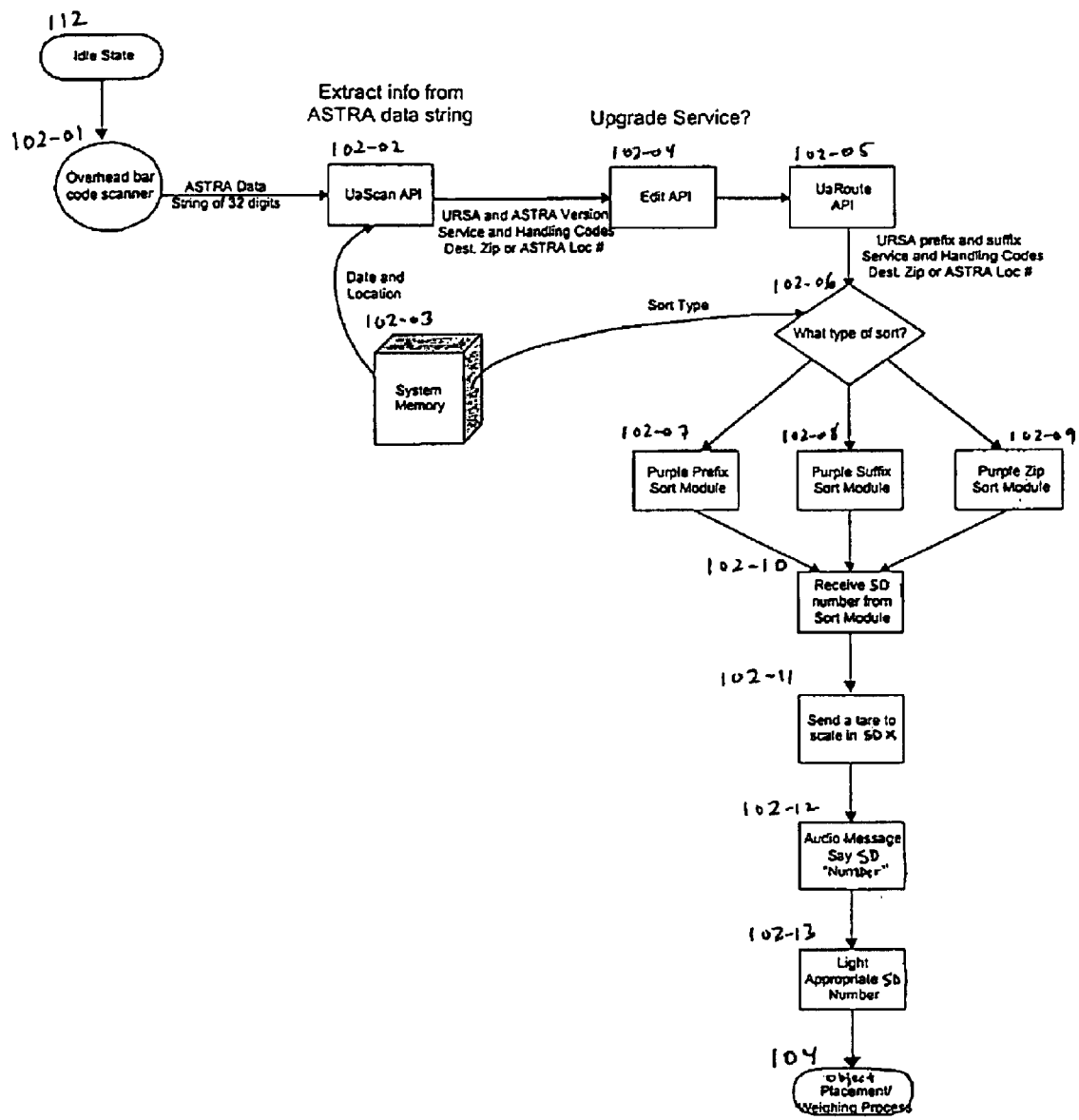
FIG. 6 is a flow-chart of the capture indicia from object/lookup routing process shown in FIG. 1.

In the preferred embodiment further illustrated in FIGS. 4, 5, and 6, a machine-readable indicia capture device (not shown) is used to capture (e.g., scan) object information from machine-readable indicia (e.g., a bar-code) from an object, step 128-01 and step 102-01. The information capture device is preferably mounted overhead for capturing the information from indicia on each object as it moves along a conveyor belt under the information capture device. Alternatively, the indicia could be read by a hand-held information capture device or other reader capable of capturing information automatically. For example, an operator may hand-scan each object with a hand-held information capture device, especially if the number of objects needing to be scanned is small. Although a moving conveyor belt is used in the preferred embodiment, an operator or other appropriate machine may move the object across the reader. In short, any method allowing a computer to access information would suffice to complete step 128. The preferred machine-readable indicia is a bar-code using an ASTRA data string of 32 digits. Any machine-readable indicia that provides sufficient information for control system 2 to ascertain the needed information for determining sort destination alternatively may be employed.

After an object is scanned, the information capture device sends data representing the indicia (step 102-03) to control system 2. Control system 2 interprets the indicia, step 102-02, to find the object information. Control system 2 then determines the routing information either by comparing the object information against a routing database (remote or local, but preferably local), or preferably without comparing the object information to the routing database is cases where the routing information is included in the object information (see FIG. 6). The routing information may be adjusted by control system 2 based on the sort type and geographical location where the sort is performed. The routing information includes the eventual destination which corresponds to a sort destination, but not necessarily where the sort destination is located in the sort destination module (i.e., which column and row in the module, usually represented by number). To remedy this, control system 2 uses the routing information to determine the correct sort module which control system 2 then accesses to find the correct sort destination number corresponding to the eventual destination for the object (step 102-10). Once control system 2 knows the correct sort destination number for the object, it sends a tare to the scale of the correct sort destination, step 102-11 (i.e., the sort destination's weight is reset). A command identifying the correct sort destination for the object is generated by control system 2, and control system 2 waits for the object to be placed in any of the sort destinations (object placement/weighing process step 104). Control system 2 preferably informs the operator as to where to place the object by an audio instruction, such as "place object in sort destination number eight" (step 102-12) and by activating a light located adjacent the appropriate sort destination, (step 102-13). Any other appropriate means of informing the operator as to where to place the object could also be used.

Figure 7:
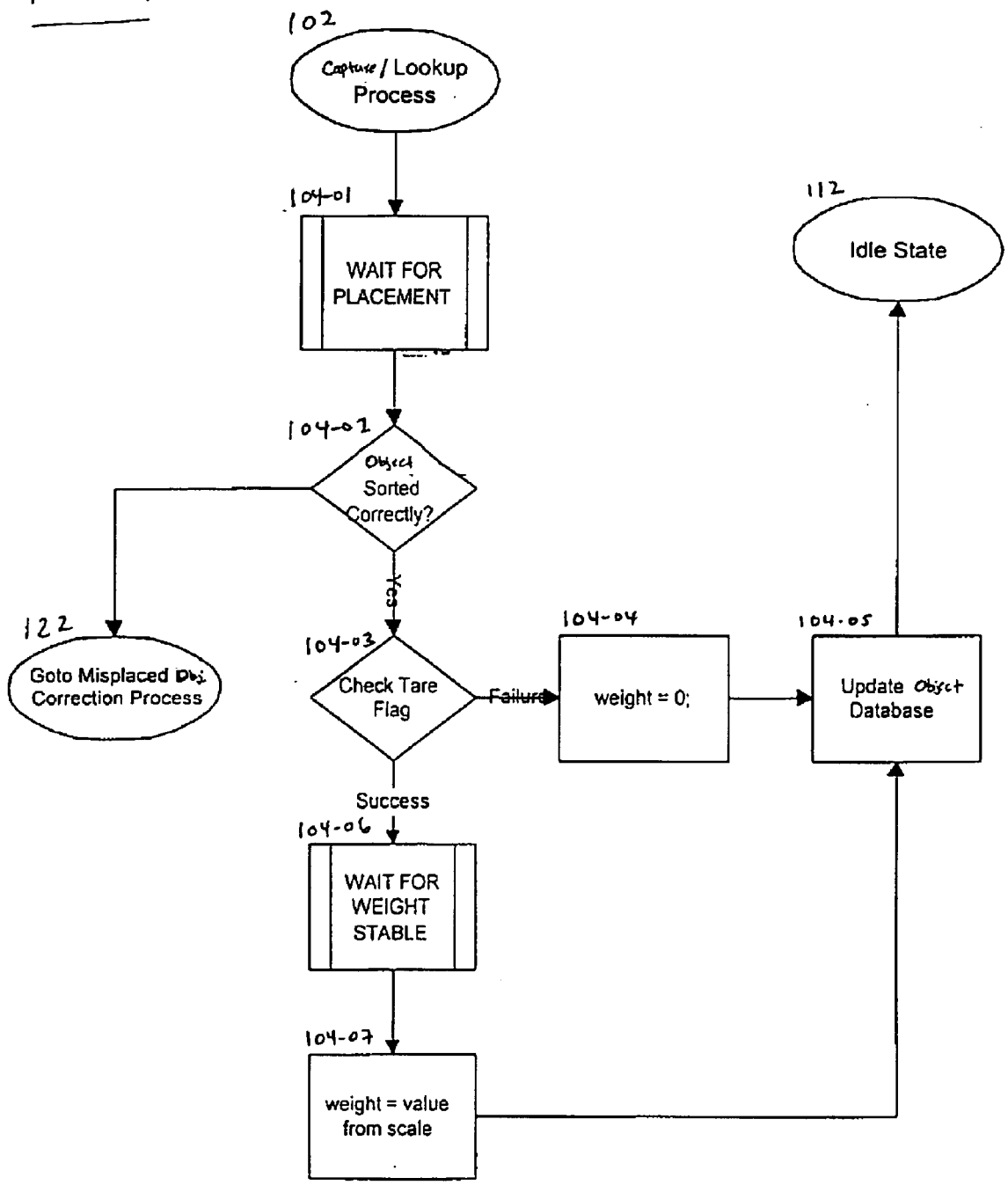
FIG. 7 is a flow-chart of the object placement weighing/process shown in FIG. 1.

Referring to FIG. 7, after an object has been scanned and control system 2 has determined where the object should be placed and has informed the operator, control system 2 waits for the operator to place the object in a sort destination (step 104-01). It then verifies correct sorting, namely, that the object is in the correct sort destination (step 104-02). Preferably, control system 2 verifies according to the processes illustrated in FIG. 1 and more specifically in FIGS. 7 and 8—the misplaced object correction process step 122 and the object placement/weighing process step 104. In step 104, control system 2 uses photo sensors (not shown) to determine which sort destination the operator placed the object in. Alternatively, however, any sensor capable of sensing whether an object is placed within a sort destination, such as a scale or motion detector, would also suffice. Assuming the object was placed in the correct sort destination, control system 2 checks the tare flag (step 104-03). The tare flag is set to indicate if the scale tare (step 102-10) was successful. If the tare flag indicates that the scale tare was not successful, control system 2 sets the weight of that object to zero (step 104-04), updates the object database (step 104-05), and idles (step 112), typically to wait for another object to be sorted. If the tare flag indicates that the scale tare was successful, control system 2 waits for the scale to stabilize, step 104-06, receives the weight from the scale for that object, and sets the object's weight in the object database to that weight, step 104-07, and returns to idle state step 112, again usually to wait for another object to be sorted.

Figure 8:
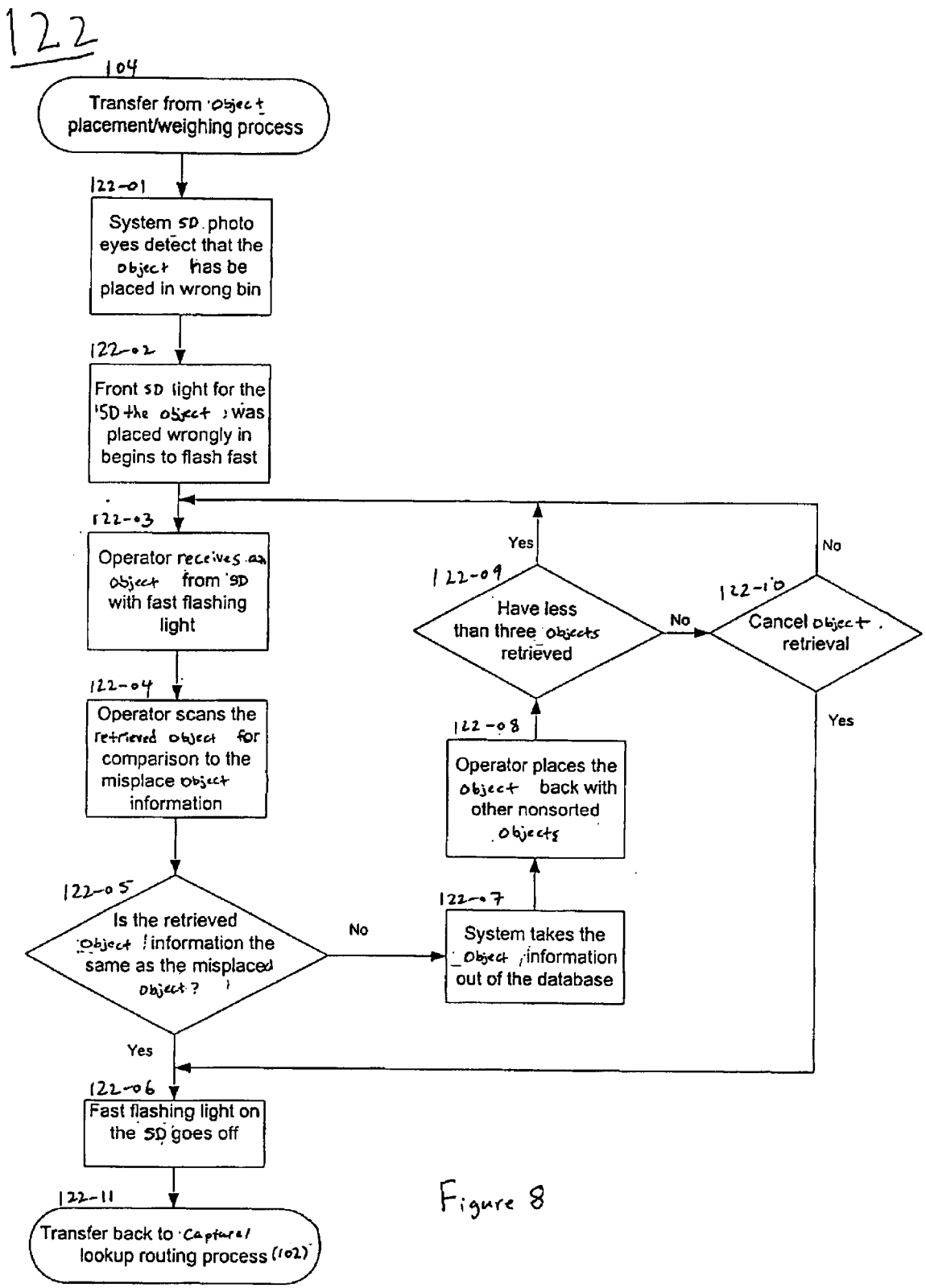
FIG. 8 is a flow-chart of a misplaced object correction process in shown in FIG. 1.

If the object is placed in an incorrect sort destination, control system 2 follows the misplaced object correction process step 122, illustrated in FIG. 8. If an object is not placed in the correct sort destination, control system 2 invokes the misplaced object correction process step 122. Here control system 2 attempts to help the operator find the particular object that was incorrectly placed in a sort destination. Photo sensors on each sort destination are linked to control system 2. When control system 2 detects, through one of these sensors, that the object has been placed in a wrong sort destination (step 122-01), a light located along the sort destination that the object was incorrectly placed into flashes, step 122-02. At this point the operator notes the mistake and retrieves the object from the incorrect sort destination (step 122-03). To make sure that the correct object was retrieved, the operator scans the retrieved object (step 122-04). Control system 2 then compares the machine-readable indicia with that of the correct object (step 122-05). If they are the same, the light at the incorrect sort destination is turned off (step 122-06) and control system 2 returns to step 102 whereby control system 2 again determines where to place the retrieved object and so instructs the operator. If the retrieved object does not have the same indicia as the incorrectly-placed object, control system 2 removes the object information associated with the retrieved object from the database (step 122-07) and the operator is instructed to place the object back with the non-sorted objects, step 122-08. The operator continues to retrieve objects from the incorrect sort destination that were placed into that sort destination until the improperly-placed object is retrieved, or until three objects have been incorrectly removed from the incorrect sort destination (control system 2 checks according to step 122-09). In either case, control system 2 cancels the object retrieval step 122-10, turns off the flashing light on the incorrect sort destination, and returns, step 122-11, to step 102.

Figure 9:
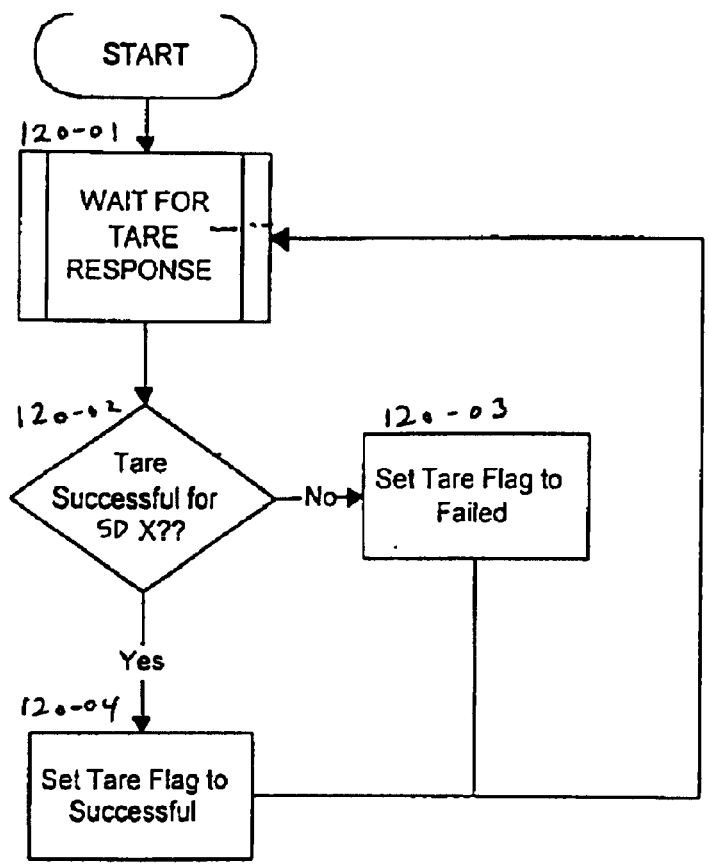
FIG. 9 is a flow-chart of the tare process shown in FIG. 1.

The tare scale process step 120 has been described briefly above. Referring to FIG. 9, in the tare scale process step 120, control system 2 waits for the scale to tell control system 2 the status of the scale, tare response step 120-01. If the tare was not successful, i.e., the scale does not read a stable weight within an acceptable range, control system 2 checks the scale according to step 120-12, and sets the tare flag to failed, step 120-03. If it was successful, i.e., the scales working properly and the scale tare was successful, control system 2 sets the tare flag to successful (step 120-08). In both instances, the tare scale process then continues to wait for additional input, such as from a new object being placed in the sort destination which changes the weight which the scale reads. Each new input called a tare response, step 120-01.

The soft automation system goes through many repetitions of the above processes. As the method for sorting objects is repeated, many objects are sorted and the crates fill up. Preferably, the soft automation system uses the illustrated process of FIG. 10 to close out a sort destination when its crate fills up. In this process control system 2 must first determine when the sort destination is full. There are three ways to do this in the preferred embodiment. First, control system 2 receives information from the scale indicating that the sort destination's weight has reached a certain amount. Once this happens, control system 2 closes out the sort destination used and informs the operator by illuminating a light, sort destination close out step 148. In the second way, the operator presses a pushbutton light associated with the sort destination when the crate appears full. Likewise, in the third, the quarterback presses a quarterback pushbutton light associated with the sort destination when it looks full. In each of these cases, control system 2 initiates sort destination close out process step 148. If the sort destination is waiting for an object to be placed in it, or is waiting for the scale to read the sort destination's weight, step 148-02, control system 2 will wait until that object has been placed in the crate or the scale has read the weight (step 148-03) before closing out the sort destination.

Generally, the quarterback is responsible for removing the full crates. Therefore, control system 2 will illuminate a light associated with the sort destination containing the full crate, step 148-04 to alert the quarterback. The quarterback then removes the full crate from the sort destination, step 148-05. Once the scale, which is constantly reading the sort destination's weight and sending that information to control system 2, has indicated that the sort destination is empty (see step 148-06), control system 2 sets pushbutton indicator 32, the pushbutton light on the back side of the sort destination, to a fast flash, step 148-07. The quarterback then pushes indicator 32, step 148-08. That action signals control system 2 to print a label or tag to be affixed to the sort destination (step 148-09), using machine-readable indicia printer 54, updates the database (step 148-10), and waits until printer 54 has completed printing the tag. Once printer 54 is finished (see step 148-11), control system 2 monitors the sort destination's scale to determine if an empty crate has been placed in the sort destination, step 148-12. If it has not, control system 2 changes the quarterback's light 32 to a slow flash, step 148-13. The quarterback next places an empty crate in the sort destination, step 148-12, so that the operator may put objects in that sort destination. Once the scale indicates that an empty crate is in the sort destination, control system 2 turns off the sort destination light (pushbutton indicator 28), step 148-15, and sets the sort destination to a "ready" status, so that the operator may sort objects into the sort destination (see step 148-16). When all of the objects in a lot have been sorted, control system 2 is informed by the operator. Control system 2 then shuts down the sorting operation, proceeds with end sort mode 148-17, and returns to end sort process step 150 to finish the sort. If not, control system 2 returns to idle state step 112, to step 148-718, and waits to sort more objects.

Figure 11:
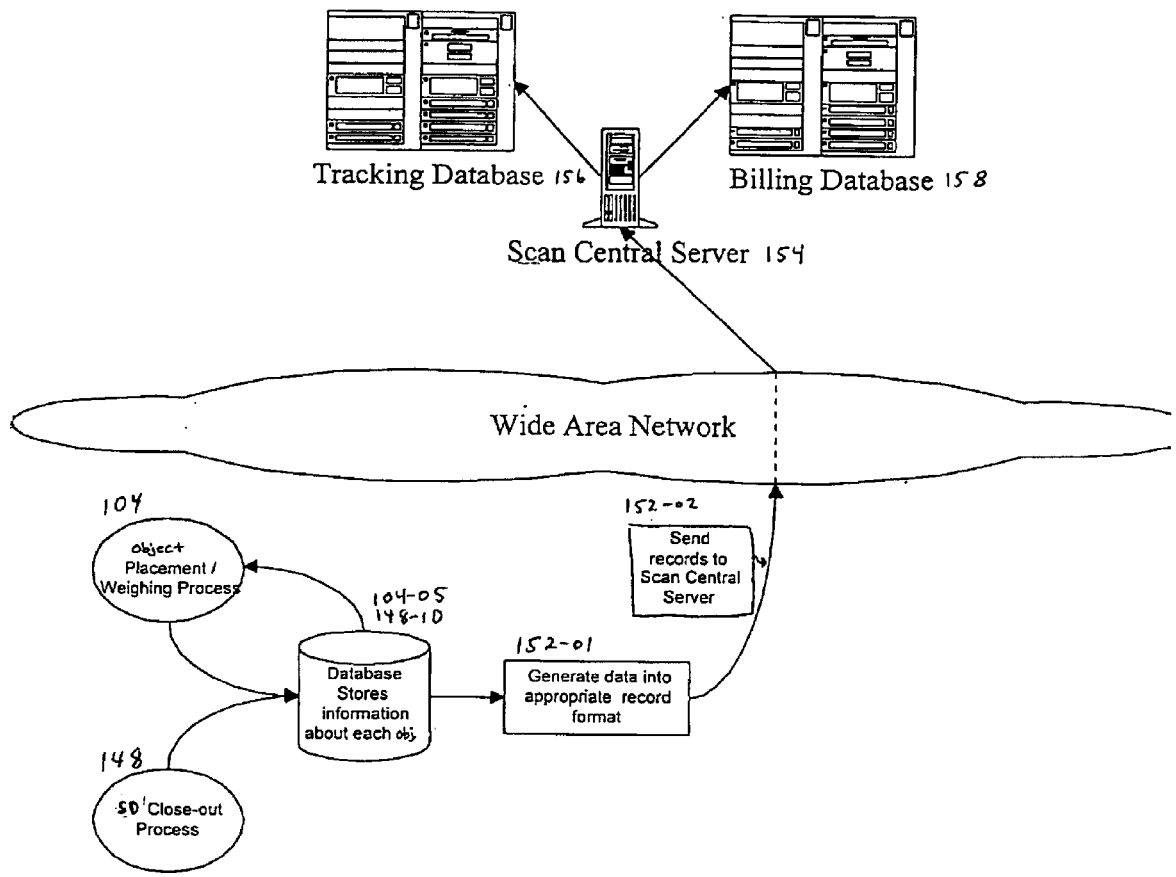
FIG. 11 is a flow-chart of the object database and upload process shown in FIG. 1.

Referring to FIG. 11, during sort destination close-out process step 148, and document placement/weighing process step 104, control system 2 records information about each object into a database, steps 104-05 and 148-10. In this process control system 2 uses the database to generate data in an appropriate record format, step 152-01, and sends this formatted record through a wide area network, step 152-02, to a scan central server 154. This server communicates with a tracking database 156 and a billing database 158. Pertinent information sent to the databases includes the weight of the objects. The weight data can be used for revenue recovery, as scales 24 used in the soft automation system are legal for trade. Likewise, other pertinent information, such as when an object was processed and where, can be used to track the object, and is recorded in tracking database 156.

Figure 12:
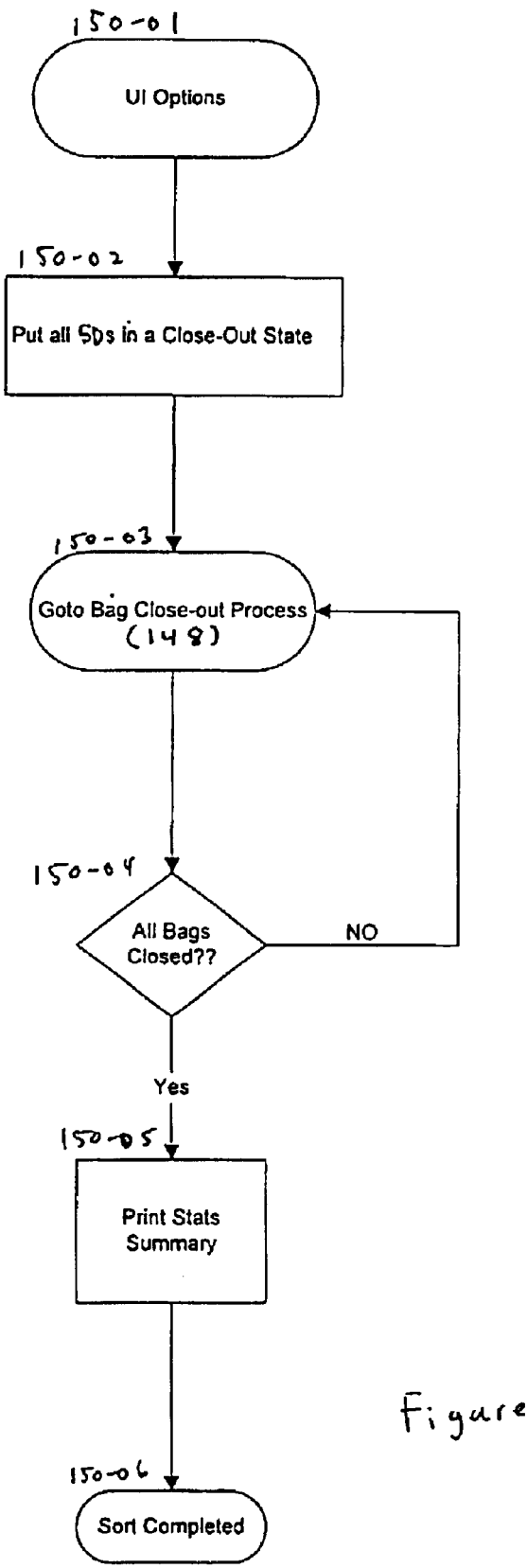
FIG. 12 is a flow-chart of the end sort process shown in FIG. 1.

Referring to FIG. 12, as noted previously, the soft automation system closes each session of sorting according to end sort process step 150. In this process the operator initiates the sort process through the user interface, step 150-01, e.g., by pressing a button. Control system 2 then marks all of the sort destinations as being in a close-out state, step 150-02, and follows the sort destination close-out process step 148. Once the sort destination close-out process step 148 is complete, control system 2 checks each sort destination's status. If all sort destinations are closed, step 150-04, a statistical summary of the sort session is generated and printed, step 150-05, and the sort is complete, step 150-06. If each sort destination's status is not closed, it returns to the sort destination close-out process step 148 until each is closed-out. Control system 2 proceeds to statistical summary step 150-05 in which data is generated concerning how the entire sort was completed, and includes such information as how long the sort took to complete, how many errors were made, which objects were over-weight, how many objects were sorted, where they were sorted to, and other similar information.

The embodiment of the above method uses a machine as well as people, the specific machine and its peripheral structure used to complete this method are described below.

In accordance with the present invention, an object sorting system comprises a rack system, comprising a plurality of sort destination modules, each sort destination module further comprising a sort destination for holding at least one object, and a management system comprising a control system, an information capture device for reading machine-readable indicia from each object and for outputting the information to the control system, and an audio system for providing instructions to an operator.

Figure 13:
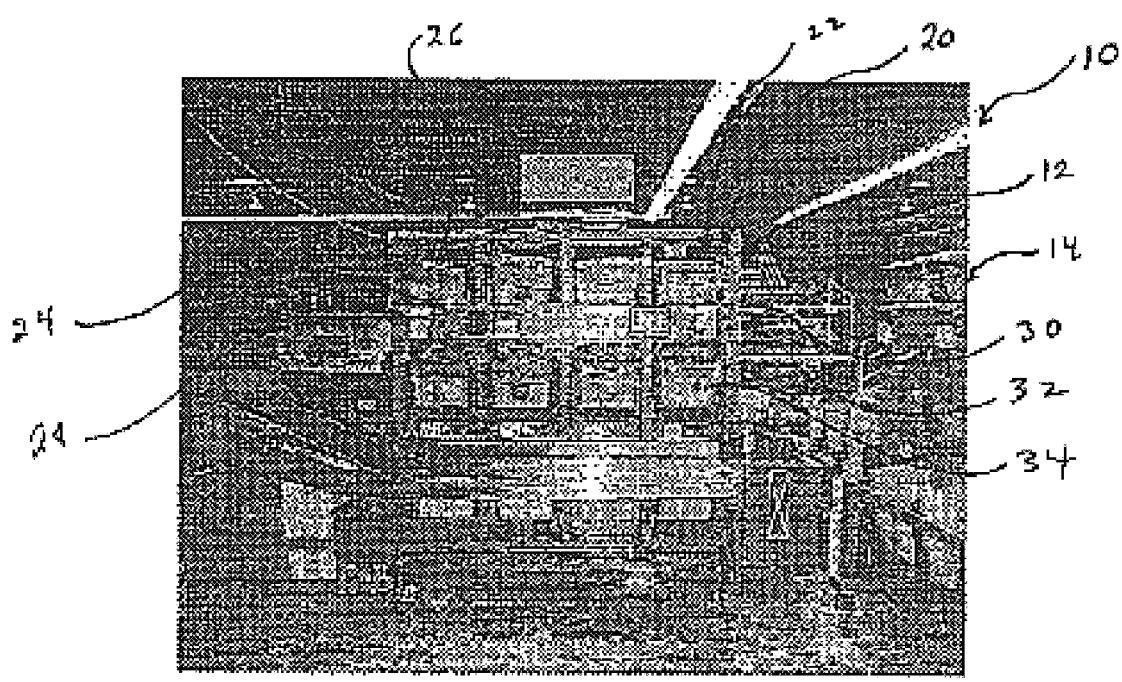
FIG. 13 is a side view of a rack sorting system in accordance with the present invention.

In the preferred embodiment illustrated in FIG. 13, rack system 10 includes a primary rack 12 including a number of sort destination modules 20. Each sort destination module 20 contains a sort destination 22, a scale 24, a placement sensor 26, an indicator 28, and additional indicators (push-button indicator 30 and alert indicator 32). Sort destination 22, which is a rectangular or cubical enclosure provided within each sort destination module 20, is adapted to accommodate a crate 34. This illuminated indicator 28 is a push-button light which informs the operator that an object should be placed in the sort destination. It is located at or near the front-side of the sort destination 22 so that the operator, who works at the front sides of the sort destinations, can easily see and reach it. Indicator 28 also acts as an input, i.e., it is a push-button illuminated switch. Where an operator presses indicator 28, control system 2 is alerted that a task will be completed by the operator. Placement sensor 26 is a proximity-type sensor, preferably a photo-eye sensor, which monitors when an object is placed in the sort destination. As a backup, scale 24 also monitors when an object is placed in the sort destination, as a result of the sort destination becoming heavier. Both placement sensor 26 and scale 24 communicate this information to control system 2, as discussed more fully below. Scale 24 also senses when and if a crate 34 has been placed in its sort destination 22, and how much the crate weighs. This permits keeping track of the weight of objects so that the delivery company can charge an appropriate fee. Another lighted push-button switch, push-button indicator 30, is mounted adjacent the back side of the sort destination module so that the quarterback, who works on the back-sides of the modules, can receive from and input information to control system 2. Another light, alert indicator 32, is also mounted adjacent the back of the sort destination for use by the quarterback.

The object sorting system also includes wiring for connecting rack system 10 with control system 2, as well as mounting locations for an overhead information capture device 36, user interface 38, and sound system 40. Overhead information capture device 36 (not shown in FIG. 13, see FIG. 14) scans an object's indicia, user interface 38 is used by the operator to communicate with control system 2, and sound system 40 is used by control system 2 to 111 communicate with the operator through audible messages.

By communicating with scale 24, control system 2 determines which sort destination an object was placed in, the time when the object was placed, and its weight. Scale 24 outputs the weight of: each object placed within sort destination 22, crate 34, and the total weight of the objects within crate 34. This information is communicated to control system 2.

Figure 14:
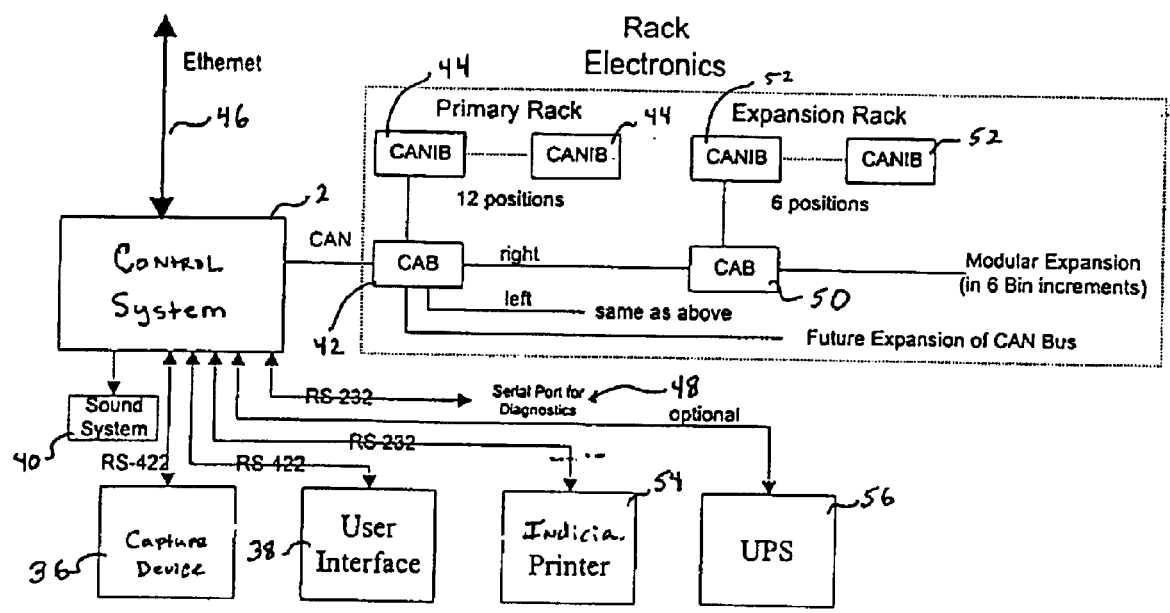
FIG. 14 is a block diagram of system architecture of a rack-sorting system in accordance with the present invention.

Control system 2 also communicates with information capture device 36, as shown in the preferred embodiment of FIGS. 14, which reads the bar-code or other machine-readable indicia on each object. Alternatively, any type of information capture device capable of reading machine-readable indicia and capable of transmitting needed information to control system 2, to allow a determination on which sort destination 22 is the correct sort destination to place to object into, may be used.

User interface 38 of the management system preferably allows the operator (also called the user) to input his or her identity into control system 2. User interface 38 also acts as a communication device between the operator and control system 2 via a terminal display, a keyboard, and an audio system (in conjunction with the other communication devices such as the pushbutton lights).

The preferred rack system includes machine-readable indicia printer 54, a printer lighted button (not shown), an uninterruptible power supply (UPS) 56, an Ethernet connection 46, and a serial diagnostics port 48. Control system 2 outputs commands to the printer 54 and the UPS 56, and communicates externally through the Ethernet connection 46.

Figure 15:
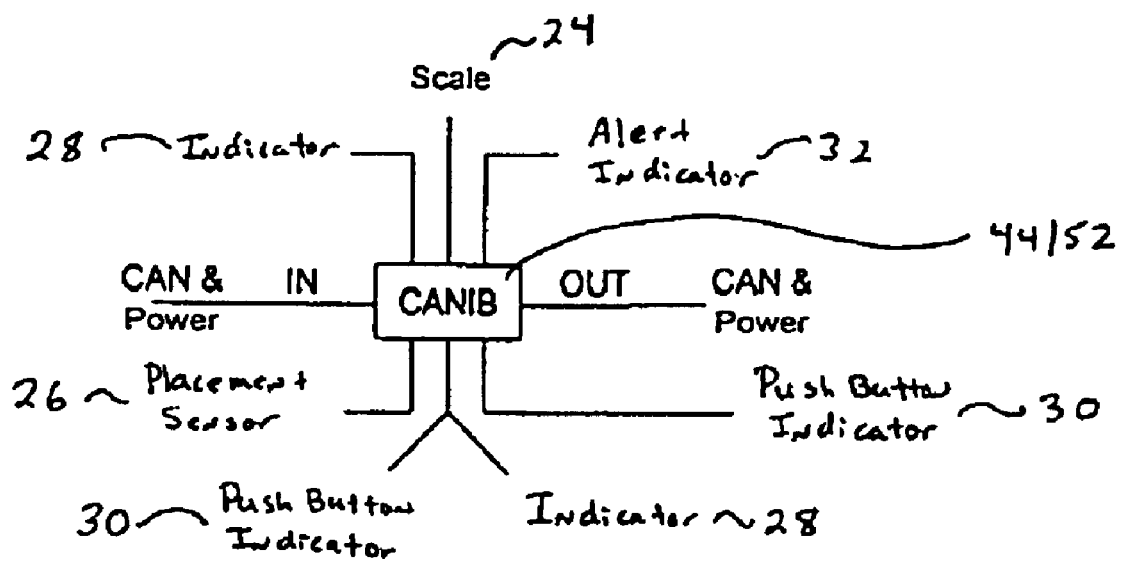
FIG. 15 is a diagram of input/output points and related architecture of a controller area network interface board shown in FIG. 14.

Referring to FIGS. 14 and 15, control system 2 preferably communicates and controls rack system 10 via a controller area network bus (not shown), a controller area network addressing board 42, and a controller area network adaptor card (not shown) and an interface board 44 for each sort destination 22. Addressing board 42 distributes power and communications between each rack and control system 2. Control system 2 uses addressing board 42, in conjunction with the controller area network adaptor card to communicate with interface boards 44 and the controller area network bus. These communications can auto-terminate the bus, provide a unique node address for each of interface boards 44, and distribute power to interface boards 44. A unique node address is needed by each interface board 44 so that control system 2 can distinguish each sort destination, sensor, and indicator from the others. Further, interface boards 44, in conjunction with the controller area network adaptor card, are used by control system 2 to communicate with first indicator 28, push-button indicator 30 and alert indicator 32, scale 24. By communicating with these, control system 2 can, for instance, visually instruct the user where to place the object. Control system 2 also uses interface boards 44 to communicate with object placement sensor 26 and a crate placement sensor, which is preferably scale 24, for each sort destination. By so doing, control system 2 could, for example, learn that an object or empty crate was placed within a specific sort destination. Thus, interface boards 44 light up each set of indicators 28, 30, and 32 and monitor if any of them have been pressed. Interface boards 44 preferably communicate with control system 2 through the controller area network bus at a rate of 250 kbp/s to enable objects to be sorted quickly. In addition, control system 2 is preferably connected to Ethernet connection 46 for communication between control system 2 and at least one external device and serial port 48 for communication between control system 2 and at least one diagnostic system. These are preferred because they allow control system 2 to update a scan central server 154 and to be checked for flaws.

The object sorting system preferably also includes, when the quantity of objects to be sorted requires additional sort destinations, additional expansion racks 14. Expansion racks 14 are preferably just like primary racks 12 of rack system 10 already discussed. When rack system 10 includes expansion racks 14, the management system includes a second controller area network addressing board 50 and a corresponding number of second controller area network interface boards 52 for each expansion rack 14. Like without expansion racks 14, the addressing boards (50, in this case of expansion racks 14) can auto-terminate the bus, provide a unique node address for each interface board 52, and distribute power to interface boards 52. Likewise, each interface board 52 controls scale 24, lights 28, 30, and 32, and object placement sensor 26 for its sort destination. Expansion racks 14 are structurally identical to primary rack 12 except that each primary rack 12 comprises twelve sort destination modules 20, but each expansion rack 14 comprises only six sort destination modules 20.

It will be apparent to those skilled in the art that various modifications and variations can be made in the object sorting method and system of the present invention and in construction of this system without departing from the scope or spirit of the invention.

Other embodiments of the invention will be apparent to those skilled in the art form consideration of the specification and practice of the invention disclosed herein. It is intended that the specification and examples be considered as exemplary only, with a true scope and spirit of the invention being indicated by the following claims.

What is claimed is:

1. A method for sorting objects having machine-readable indicia thereon, comprising the steps of:

capturing object information from the machine-readable indicia on at least one object moving within a rack system;

determining routing information from the object information;

determining, based on the routing information a correct sort destination for the at least one object to be delivered to within the rack system;

generating a visual and/or audio command identifying the correct sort destination for the at least one object; and creating a record for the at least one object including the routing information for delivering the at least one object to the correct sort destination within the rack system and a weight for the at least one object and a sort rate, a sort accuracy, an idle time, a sort start and stop time, and a number of the objects processed within the rack system.

2. The method of claim 1, wherein the object information is captured as the at least one object moves on a conveyor belt.

3. The method of claim 1, wherein the object information is captured as the at least one object moves with manual assistance.

4. The method of claim 1, further comprising the step of measuring the weight of the at least one object by weighing the correct sort destination containing the at least one object.

5. The method of claim 1, wherein the generating a visual and or audio command identifying the correct sort destination for the at least one object is performed by illuminating, an indicator near the correct sort destination.

6. The method of claim 1, further comprising the step of verifying that the at least one object has been placed into the correct sort destination.

7. The method of claim 6, wherein the verifying step is performed using a photo sensor, motion detector, or scale.

8. The method of claim 6, further comprising the step of generating visual and/or audio commands if the at least one object is not placed into the correct sort destination.

9. The method of claim 8, wherein the step of generating visual and/or audio commands is performed by illuminating an indicator near an incorrect sort destination into which the at least one object was placed.

10. The method of claim 8, further comprising repeating the previous steps for each subsequent object.

11. The method of claim 10, further comprising the steps of:

recording when the at least one object is placed in the correct sort destination;

recording when the at least one object is placed in an incorrect sort destination;

recording when a sort is started and stopped; and calculating, based on the recorded times, a sort rate, a sort idle time, a sort accuracy, and a total number of objects processed.

12. The method of claim 1, further comprising the steps of:

uploading the record to a database; and transmitting data from the database to one or more of an object tracking database, a billing database, and a scan central server.

13. The method of claim 1, further comprising the step of capturing an operator's identity.

14. The method of claim 1 wherein the determining routing information from the object information is performed by comparing the object information to a local or remote database that contains the routing information associated with the object information.

15. The method of claim 1, wherein the object information is captured as the at least one object moves with mechanical assistance.

16. An object sorting system comprising:

a rack system comprising a plurality of sort destination modules, each sort destination module further comprising a sort destination for holding at least one object; and a management system comprising:

a control system;

an information capture device for reading machine-readable indicia from each object and for outputting the information to the control system;

an audio system and/or visual indicators for providing instructions to an operator; and a recording device for creating a record for at least one object within the rack system, including the routing information to one of the plurality of sort destination modules and a weight for the at least one object and a sort rate, a sort accuracy, an idle time, a sort start and stop time, and a number of the objects processed within the rack system.

17. The object sorting system of claim 16 wherein the sort destination modules further comprise at least one indicator identifying that the at least one object should be placed in the sort destination and wherein the control system outputs a signal to the at least one indicator for each of the plurality of sort destination modules.

18. The object sorting system of claim 16 wherein the sort destination modules further comprise at least one placement sensor for monitoring when the at least one object is placed in the sort destination and wherein the control system inputs information from the at least one placement sensor for each of the plurality of sort destination modules and determining which sort destination the at least one object was placed in and when the at least one object was placed in the sort destination.

19. The object sorting system of claim 16 wherein the sort destination modules further comprise a scale for weighing the sort destination and wherein the control system inputs and records the weight of the sort destination containing the at least one object.

20. The object sorting system of claim 16 wherein the sort destination modules further comprise:

at least one indicator identifying that the at least one object should be placed in the sort destination;

at least one placement sensor for monitoring when the at least one object is placed in the sort destination; and a scale for weighing the sort destination;

wherein the control system:

outputs a signal to the at least one indicator for each of the plurality of sort destination modules;

inputs information from the at least one placement sensor for each of the plurality of sort destination modules;

determines which sort destination the at least one object was placed in and when the at least one object was placed in the sort destination; and inputs and records the weight of the sort destination containing the at least one object.

21. The object sorting system of claim 20 wherein the management system further comprises a user interface.

22. The object sorting system of claim 21, wherein the user interface is used to input an operator's identity and to output the operators identity to the control system.

23. The object sorting system of claim 20, wherein each of the plurality of sort destination modules further comprises:

a crate placement sensor for monitoring whether the crates is within the sort destination, and a second indicator for indicating, when the crate should be changed based upon a predetermined parameter associated with the crate.

24. The object sorting system of claim 23, the rack system further comprising:

a controller area network bus for communicating, with the control system and a controller area network addressing board; and a controller area network adaptor card for communication between the control system, the controller area network bus, and a plurality of interface boards.

25. The object sorting system of claim 24, wherein the controller area network adaptor card communicates with at least one of the plurality of interface boards and the controller area network bus, auto-terminating the bus, providing a unique node address for each of the plurality of interface boards, and distributing power to the interface boards.

26. The object sorting system of claim 25, wherein the controller area network adaptor card communicates with the interface boards, each interface board communicating with the first indicator, the second indicator, and the scale, and additionally capable through additional I/O ports to interface with the sort destination placement sensor and the object placement sensor.

27. The object sorting system of claim 26, wherein the interface boards communicate with the control system through the controller area network bus.

28. The object sorting system of claim 20, the management system further comprising: an Ethernet connection for communication between the control system and at least one external device; and a serial port for communication between the control system and at least one diagnostic system.

29. The object sorting system of claim 20, where each placement sensor includes a proximity-type sensor.

30. The object sorting system of claim 20, where each of the first indicators are mounted near the front-side of each sort destination, and each of the second indicators are mounted near the back-side of each sort destination.

* * * * *

UNITED STATES PATENT AND TRADEMARK OFFICE
CERTIFICATE OF CORRECTION

PATENT NO. : 6,786,404 B1  
DATED : September 7, 2004  
INVENTOR(S) : Brett B. Bonner et al.

Page 1 of 1

It is certified that error appears in the above-identified patent and that said Letters Patent is hereby corrected as shown below:

Title page,
Item [57], ABSTRACT,
Line 15, "optrator" should read -- operator --.

Column 12,
Line 1, after "information", insert a comma.

Column 14,
Line 7, "operators" should read -- operator's --.
Line 12, "crates" should read -- crate --.

Signed and Sealed this

Twenty-first Day of December, 2004

JON W. DUDAS  
*Director of the United States Patent and Trademark Office*